Aug. 2, 1960 W. J. LONG 2,947,244

INDICATION APPARATUS

Filed Dec. 4, 1956 2 Sheets-Sheet 1

INVENTOR.
William J. Long

BY Henry L. Hanson

ATTORNEY

Aug. 2, 1960 W. J. LONG 2,947,244

INDICATION APPARATUS

Filed Dec. 4, 1956 2 Sheets-Sheet 2

INVENTOR.
William J. Long

BY Henry L. Hanson

ATTORNEY 2,947,244

INDICATION APPARATUS

William J. Long, Framingham, Mass., assignor, by mesne assignments, to Minneapolis-Honeywell Regulator Company, a corporation of Delaware Filed Dec. 4, 1956, Ser. No. 626,250

12 Claims. (Cl. 101—77)

A general object of the present invention is to provide a new and improved apparatus for printing sequentially changed data on a record member. More specifically, the present invention is concerned with a new and improved apparatus providing for the printing of sequentially changing data on a record medium where the printing mechanism has a positive and absolute indexing means operated with respect to an indicating mechanism so that once the printing mechanism and the indicating mechanism have been set, the indexing can not be disturbed even though the mechanisms may be decoupled from the indexing position.

The sequential numbering of records is required in the handling of many business forms. For example, stock certificates, bonds, data record cards, and the like are frequently individually identified by the presence of a number which is different for each record of the series. In the case of data record cards such as punched cards of the Hollerith type, it is sometimes expedient to print a number on the card as the card is being fed through a card reading mechanism. At the time that the card is passing through the reading mechanism, the number may be printed on the edge of the card or at some other desirable location, and at the same time an electrical signal in the form of a code may be sent along with the data read from the card to represent the coded number printed on the card. The coding of the sequential number printed on the record has been most conveniently handled by means of code wheel segments attached directly to indicating wheels maintained in synchronism with the printing mechanism.

When an electrically coded signal representative of the sequential number printed on a record is to be transferred, it is essential that the coded number be accurately representative of the number that was printed. The accuracy required can be achieved only by insuring that the code wheels are positively synchronized with respect to the printing mechanism. Printing mechanisms of the type heretofore available have attempted to achieve this by resilient drives and ratchet drives which have inherently dropped out of synchronism under long periods of use due to the collection of ink, dust, grease, and other foreign substances in the coupling mechanism between the printer and the code wheels or indicating means.

An apparatus of the present type must also be arranged so that the indexing of the printing mechanism and the indicating means may be stopped at a desired instant while maintaining a desired and absolute indexed relationship between the printing mechanism and the indicating mechanism or code wheels.

It is therefore a further more specific object of the present invention to provide a new and improved sequential number printing apparatus incorporating a sequentially actuated printing mechanism and a sequentially actuated indicating mechanism with a positive and absolute drive means for retaining the indexed relationship between both the printing mechanism and the indicating mechanism.

A still further more specific object of the present invention is to provide, in conjunction with the foregoing object, means for decoupling the indexing means for the printing mechanism and the indicating mechanism while maintaining a positive and absolute indexed relationship between the two mechanisms.

The achievement of the foregoing positive relationship wherein there is a positive drive connection between the printing mechanism and the indicating mechanism is achieved by the use of Geneva gear means which serve the indexing means and also the means for latching the printing and indicating mechanisms in a fixed relationship when the mechanisms are decoupled from indexing. This type of drive is independent of any speed variations in the driving apparatus.

With these and other objects in view, the present invention consists in the construction, arrangement, and combination of the various elements in the novel configuration explained hereinafter. Other various features of novelty which characterize the invention as well as other more specific objects thereof will be apparent upon a consideration of the claims annexed hereto and forming a part of the present specification. For a better understanding of the invention and its advantages, reference should be had to the accompanying drawings and descriptive matter in which there is illustrated and described a specific illustrative embodiment of the invention.

Figure 1:
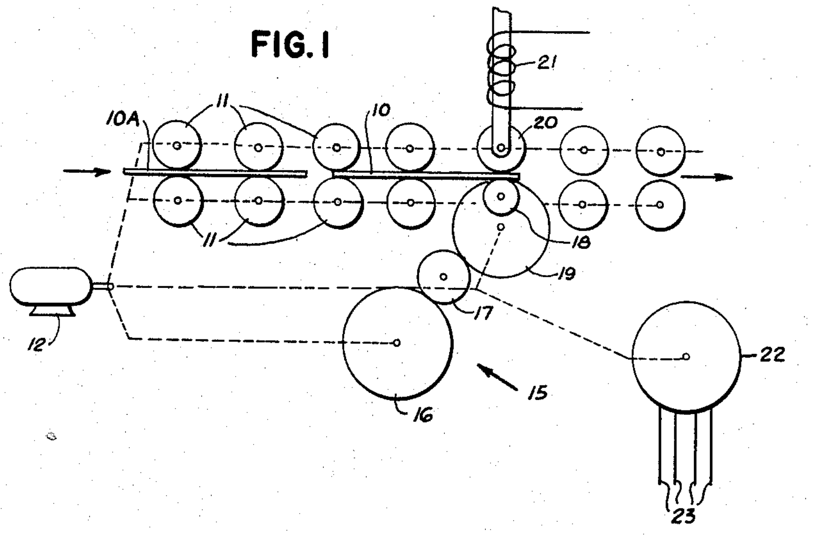
Figure 1 is representative of a portion of an apparatus wherein a printing mechanism of the present type may be used.

Referring first to Figure 1, the numeral 10 represents a record medium, such as a punched card, on which it is desired to print a sequential number. The record card 10 is adapted to be moved from left to right by way of a plurality of drive wheels 11 connected to be driven by suitable motor means 12. For printing data on the card 10, there is provided a printing mechanism 15 which comprises an inking cartridge 16, an inking transfer roll 17, a printing mechanism 18, eccentrically mounted in a housing 19, and suitable driving connections between the drive motor 12, the housing 19, the transfer roll 17, and the inking cartridge 16.

As the card 10 is in motion, and remains in motion, it is desired that the printing on the card be made without any smearing or distortion of the numbers printed. This can best be accomplished by rolling the printing mechanism 18 onto the record card 10 so that the speed of the type face will be matched to that of the card. Thus, the peripheral speed of the housing 19 which carries the printing mechanism 18 is arranged to correspond to the linear speed of the card 10.

After the particular record card 10 has had the number printed thereon, the printing mechanism is moved away from the card and while away from the card, the number will be indexed sequentially to the next number to be printed and will then be inked as it passes by the transfer roll 17 so that when the next card 10A is in position, a new number will be printed thereon.

A backing roll 20 is provided to apply a pressure to the card 10 when it is desired to print on the card. This roll 20 may be suitably removed from a pressure applying position by means of a solenoid 21 in order to prevent the printing of the number of any record card, Thus, as the printing mechanism comes around with a card in position, there will be insufficient backing pressure for the print rolls to make a legible impression upon the record and no number will be printed.

Figure 2:
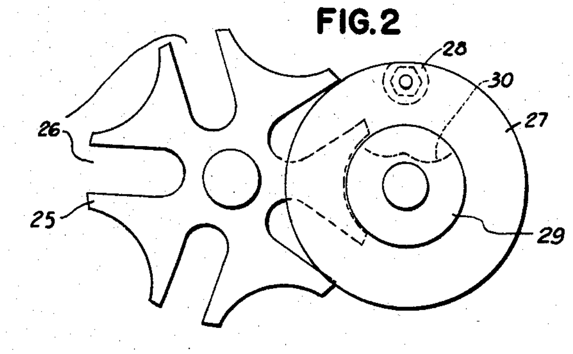
Figure 2 shows a plan view of a basic Geneva gear mechanism of the type particularly adapted for use with the present invention.
Figures 3, 4:
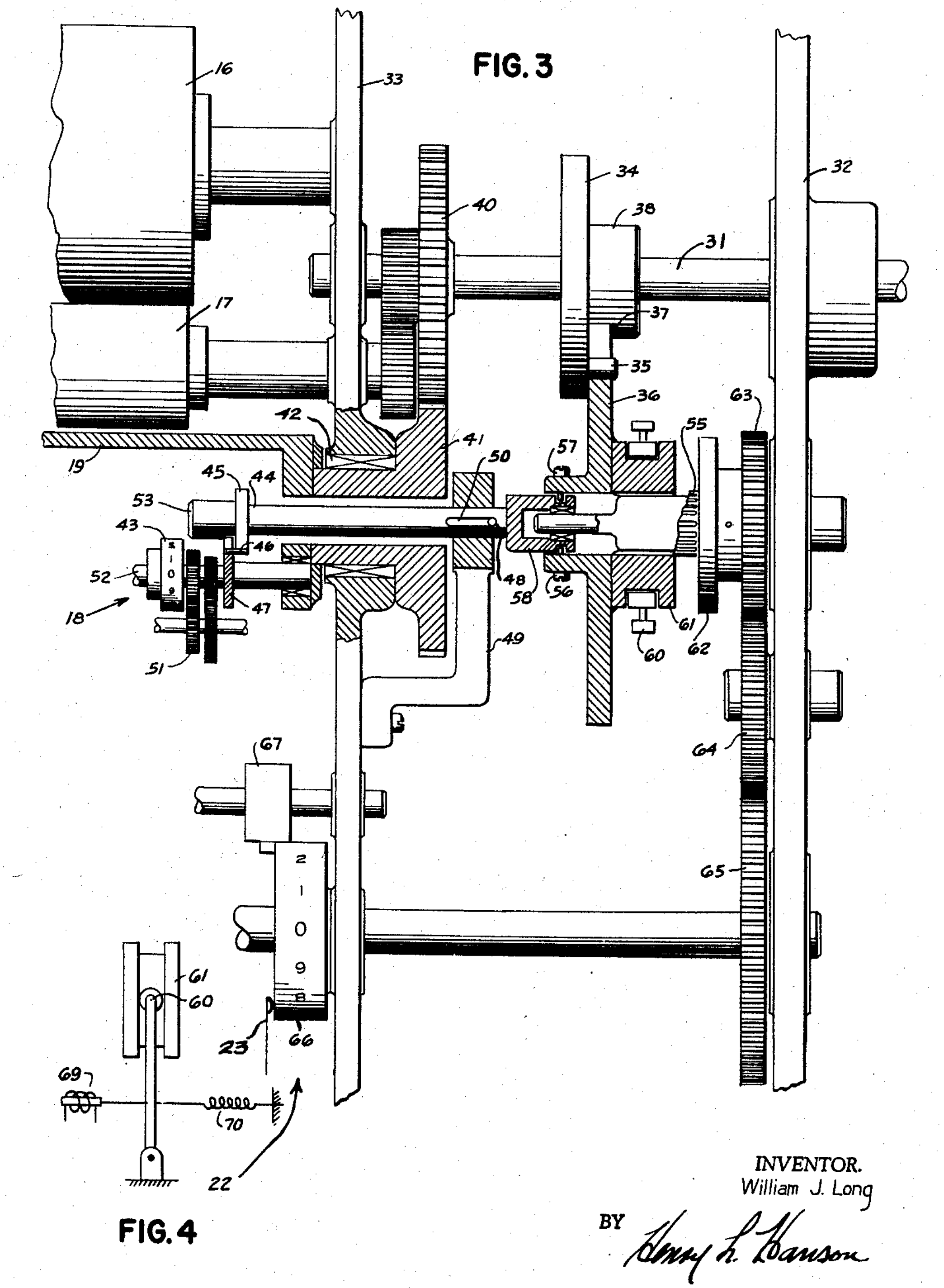
Figure 3 is a detailed schematic of the relationship of the driving means for the printing mechanism and the indicating or code wheels of the present invention.
Figure 4 illustrates one manner in which the indexing mechanism illustrated in Figure 3 may be decoupled.

If no number is printed on a card, it is desired that the indexing be stopped and this will be accomplished by the mechanism described in detail in conjunction with the Figures 2, 3, and 4.

To provide an indication of the setting of the printing mechanism 18, a suitable indicating means 22 may be provided, the latter being arranged with a driving connection common to the driving connection for the rotatable housing 19. The indicating mechanism 22 is adapted to carry coding wheels, not illustrated, which will code any decimal number from the indicating means into a suitable binary code. The output lines 23 represent the code lines adapted to be used in other circuitry, not shown.

Referring to Figure 2, there is here shown a Geneva gear mechanism which comprises a Geneva gear 25 having five slots evenly spaced in the surface thereof about the circumference of the gear and thereby designated as a five point Geneva gear. Co-operating with this Geneva gear 25 is a drive wheel 27 having a driving pin 28, sometimes referred to as a McGill cam follower which is adapted to move into the slots 26 of the gear 25 and advance the gear as the driving wheel 27 is rotated. The drive wheel 27 is shown in end view in Figure 2A. Here, the driving wheel 27 will be seen to additionally include a hub 29 having a slotted portion 30 which permits the turning of the gear 25 with respect to the wheel 27 as the wheel follower moves into the slot and advances. At all other times, the hub 29 rides in the groove surface of the gear between the slots and holds the gear stationary.

Figure 2A:
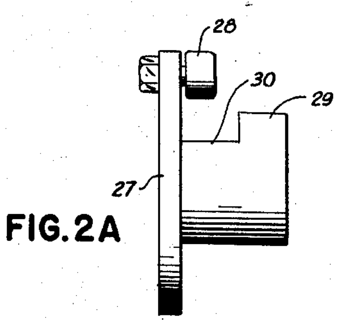

The drive gear 27 may be decoupled from the Geneva gear 25 by moving one or the other of the gears so that the follower 28 no longer moves into the slots 26. The Geneva gear 25 may be held locked if the hub 29 is retained in the grooves between the slots of the gear 25. This Geneva gear mechanism shown in Figure 2 and Figure 2A is the basis of the positive drive means utilized in the specific embodiment of the present invention illustrated in Figures 3 and 4.

Referring now to Figure 3, the numeral 31 represents an input drive shaft to which is applied the driving power for the printing mechanism and the indicating mechanism. The drive shaft 31 is suitably mounted for rotation in the supporting plate 32 at the right end and supporting plate 33 at the left end. Mounted between the supporting plates 32 and 33 is a driving gear 34 taking the form of a Geneva drive gear having a pin or McGill follower 35, the latter of which is adapted to co-operate with suitable slots in a five point Geneva gear 36. The drive gear 34 has a hub 38 suitably slotted at 37 to permit the rotation of the gear 36 and lock the gear in all other positions.

Also connected to the drive shaft 31 is a drive gear 40 which in turn connects to a drive gear 41. The drive gear 41 is journaled into the supporting plate 33 and adapted for rotary movement by suitable bearings 42. Drive gear 41 is directly coupled to the rotatable housing 19 which has eccentrically mounted therein the printing mechanism 18. The printing mechanism 18 is illustrated only in connection with a single print wheel 43, the latter of which is adapted to project outside of the peripheral area of the housing 19 into a printing position and also into engagement with the transfer roll 17 to be inked prior to the printing on the record card 10.

The indexing of the print wheel 43 is accomplished by a Geneva gear mechanism which includes a driven wheel 45 carrying a pin or McGill roller 46, the latter of which is adapted to co-operate with a Geneva gear 47 of the five point type. The drive wheel 45 is prevented from rotating by a pin 48 suitably fastened in a grounding bar 49 which is attached to the supporting plate 33. The pin 48 is positioned through a slot 50 in the surface of the shaft 44 connected to the drive gear 45.

The Geneva gear 47 is coupled through suitable transfer gears 51 to the print wheel 43, the latter of which is freely journaled on the supporting shaft common to the Geneva gear 47. The transfer gear mechanism 51 reduces the 72 degree indexing produced by the five point Geneva 47 into a thirty-six degree indexing on the print wheel 43 so as to produce indexing of a single digit. The shaft which carries the transfer gears 51 has been shown in a displaced angular position to facilitate an understanding of the coupling. In actual construction, the shaft and gears must be positioned so as not to interfere with the printing operation of the printing mechanism 18.

It will be noted that each time that the rotatable housing 19 rotates, it will move the Geneva gear 47 about the drive wheel 45 and once during each revolution, the follower 46 will move into driving relationship with respect to the gear 47 and index the print wheel 43. The hub 53 of the drive gear 45 is suitably slotted to permit the rotation of the Geneva gear 47 and to lock the gear at all times except when the indexing is taking place.

The Geneva gear 36 is suitably mounted on a splined shaft 55 so that it may be moved laterally with respect to the center axis thereof. The Geneva gear 36 carries on its left side a pair of pin members 56 and 57 suitably extending in a slot around the peripheral surface of a hub member 58 carried on the shaft 44 locked in angular position, as aforedescribed, by the pin 48. This splined shaft 55 is reduced in diameter and is suitably journaled into the end of the hub 58 and supported by the bearing 59.

The Geneva 36, and the shaft 44 are adapted for lateral movement with the movement being introduced by a yoke mechanism 60 provided in a slot grooved in the surface of a hub 61 attached to the Geneva gear 36. This hub 61 is suitably splined for engagement with the splines on the shaft 55.

Pinned to the shaft 55 on the right end thereof is a stop plate 62 which may be formed of a resilient material to minimize the shock as the yoke moves the Geneva gear 36 to the right. If desired, suitable stops may be provided on the yoke mechanism 60. Also attached to the splined shaft 55 is a gear 63 which is coupled by way of an idler gear 64 to a drive gear 65 associated with the indicating code wheel 66 of the indicating mechanism 22. Since the Geneva gear 36 is a five point Geneva, it is necessary that the seventy-two degree motion effected by the indexing by the Geneva drive gear 34 be suitably reduced to thirty-six degrees. This is accomplished by selecting the gear ratio of the gears 63 and 65 so that only a thirty-six degree motion will be effective at the indicating wheel 66. The transfer wheel 67 is adapted to couple the indicating wheel 66 to further the indicating wheels which correspond to the additional print wheel which may be incorporated in the printing mechanism 18.

Considering the normal operation of the apparatus illustrated in Figure 3, it should first be considered that the drive shaft 31 is rotating. The rotation of the drive shaft 31 is effective to impart a driving motion to the rotatable housing 19 by way of the gears 40 and 41. As the housing rotates through one revolution, the pin or follower 46 will index, by way of the Geneva gear 47, the print wheel 43. The thirty-six degree indexing effective for each revolution of the housing 19 advances the print wheel one number per revolution. After the indexing has been made, the Geneva gear 47 will be locked by the hub 53 so that the print wheels will remain stationary relative to their position in the housing 19.

As the shaft 31 is rotating, it is also effective to drive the Geneva drive gear 34 so that the Geneva gear 36 will be indexed for each revolution of the shaft 31. This indexing is transferred through this splined shaft 55 to the gear 63 and thence through the idler 64 to the gear 65 where it will apply a suitable indexing signal to the indicating wheel 66.

If for any reason it is desired to stop indexing the printing mechanism as well as the indicating mechanism, a suitable driving force is applied to the yoke 60 to shift the Geneva gear 36 to the right so that it engages the plate 62. At the same time, the shaft 44 is moved to the right so that the drive gear 45, and the pin 46 will no longer be engaging the Geneva gear 47. Similarly, the gear 36 will be decoupled from the pin 35. However, the hub 38 will still be engaging the locking surface of the Geneva gear 36 to prevent the gear from rotating to thereby lock the indicating mechanism 23. Similarly, with the gear 45 of the follower 46 removed from the Geneva gear 47, the hub 43 will still remain in the locking portion of the geneva gear 47 to prevent any indexing of the printing mechanism 18.

The operation of the yoke 60 is suitably timed, by means not shown, so that when any coupling or decoupling is to be done, it is accomplished while the extended portions of the hubs 53 and 38 are suitably locking the associated Geneva gears 47 and 36.

The yoke 60 may well be actuated in the manner illustrated diagrammatically in Figure 4 wherein a solenoid is adapted to pull the hub 61 to the left and thereby into driving relationship in both of the Geneva gear drives. The action of the solenoid 69 is counterbalanced by a suitable spring 70 which, upon de-energization of the solenoid 69, will shift the yoke 60 and the hub 61 to the right to thereby disengage the printing and indicating mechanisms. Thus, should there be a power failure, the apparatus may be suitably rendered ineffective by the decoupling of the Geneva gear mechanisms so that no further indexing will take place.

Should it be desired to manually index the print wheels, the print wheel assembly may be removed, as an entirety, adjusted, and then reinserted. Also, the individual print wheels may be provided with a suitable coupling also well known in the art whereby it is possible to manually override the coupling to the drive shaft. Similar schemes may be used in the indicating and code wheel section of the device.

It will be seen from the foregoing discussion that the present invention provides a driving mechanism whereby a positive and absolute indexed relationship is maintained at all times between the print mechanism 18 and the indicating mechanism 22 whether there is a sequential indexing taking place or whether the mechanism is in the decoupled position. Further, while a Geneva drive has been illustrated in connection with the maintaining of positive agreement between the two mechanisms, other types of gear mechanisms are suitable so long as a positive drive is maintained at all times. Further the principle of the present invention are applicable to apparatus using decimal digits, symbols, characters, and the like.

While there has been shown and described a preferred embodiment of the invention, it will be obvious to those skilled in the art that various changes and modifications may be made without departing from the spirit of the invention. It is therefore intended that the scope of the present invention be limited solely by the appended claims.

What is claimed is:

1. Apparatus for printing on a moving medium comprising a frame, a driving means, an eccentrically mounted printing mechanism mounted on said frame and adapted to be rotatably driven and brought into engagement with said medium at a peripheral speed equal to the speed of said medium, first gear means connected to said printing mechanism to index said mechanism as it is rotated, a second gear means positively connected to said driving means, an indicating mechanism fixedly mounted on said frame and coupled to said second gear means, said indicating mechanism being positively locked into mechanical agreement with said printing mechanism and adapted to be indexed and to remain indexed with said printing mechanism, and means coupled to said first and second gear means to stop the indexing of said printing means and said indicating means while said printing mechanism is rotated.

2. A sequentially indexed printing mechanism comprising a frame, a rotatable support member mounted on said frame, printing means eccentrically mounted in said support member, an indexing means coupled to said printing means to index said printing means as said support member is rotated, an indicating means fixedly mounted on said frame independently of said support member and adapted to be indexed to the same setting as said printing means, a positive and absolute drive mechanism interconnecting said indexing means and said indicating means to maintain said printing means and said indicating means in positive agreement, and means connected to said drive mechanism to disengage said indexing means from said printing means and maintain the setting of said indicating means in positive and absolute agreement with said printing mechanism.

3. A cyclically operated printing mechanism eccentrically mounted for rotation into a printing position, an indicating means fixedly mounted independently of said printing mechanism and adapted to indicate the setting of said printing mechanism, a pair of Geneva gear mechanisms connected one each to said printing mechanism and said indicating means, a common driving means connected to both of said gear mechanisms to index said printing mechanism and said indicating means during each operative printing cycle and by a corresponding amount, and a declutching means connected to both of said Geneva gear mechanisms to decouple said printing mechanism and said indicating means from further indexing by said driving means and positively retaining the indexing of both said indicating means and said printing mechanism while decoupled.

4. A cyclically operated printing mechanism eccentrically mounted for rotation within a rotatable housing into a printing position, a driving means connected to said rotatable housing adapted to continuously rotate said housing, an indexing mechanism connected to said printing mechanism comprising a Geneva gear linkage, one portion of which is prevented from rotating as said rotatable housing is rotated, the other portion of which is connected to sequentially index the printing mechanism, an indicating means fixedly mounted independently of said printing mechanism adapted to be synchronized with the indexing of said printing means to provide a continuous indication of the setting of said printing mechanism, and a Geneva gear linkage connected between said driving means and said indicating means so that the indexing between said printing mechanism and said indicating means is positive and absolute.

5. A cyclically operated printing mechanism eccentrically mounted for rotation within a rotatable housing into a printing position, a driving means connected to said rotatable housing adapted to continuously rotate said housing, an indexing mechanism connected to said printing mechanism comprising a Geneva gear linkage including a follower with one portion of said gear prevented from rotating as said rotatable housing is rotated, the other portion of which is connected to sequentially index the printing mechanism, an indicating means adapted to be synchronized with the indexing of said printing means to provide a continuous indication of the setting of said printing mechanism, a Geneva gear linkage including a follower connected between said driving means and said indicating means so that the indexing between said printing mechanism and said indicating means is absolute, and means for decoupling the follower in the Geneva gear mechanisms to prevent the indexing of said printing mechanism and said indicating means with the hubs of said Geneva gear mechanisms locking said printing mechanism and indicating means from further indexing.

6. A cyclically operated printing mechanism eccentrically mounted for rotation within a rotatable housing into a printing position, a driving means connected to said rotatable housing adapted to continuously rotate said housing, an indexing mechanism connected to said printing mechanism adapted to index said printing mechanism by one character for each revolution of said housing, an indicating means mounted independently of said housing and adapted to be synchronized with the indexing of said printing means to provide a continuous indication of the setting of said printing mechanism, a Geneva gear mechanism including a follower connected between said driving means and said indicating means so that the indexing between said printing mechanism and said indicating means is absolute, and means for decoupling the follower in said Geneva gear mechanism to prevent the indexing of said indicating means and shifting the relative position of the hub of said Geneva gear mechanism to lock said Geneva gear and said indicating means against further indexing.

7. A cyclically operated printing mechanism eccentrically mounted for rotation within a rotatable housing into a printing position, a driving means connected to said rotatable housing adapted to continuously rotate said housing, an indexing mechanism connected to said printing mechanism adapted to index said printing mechanism by one character for each revolution of said housing, an indicating means mounted independently of said housing and adapted to be synchronized with the indexing of said printing means to provide a continuous indication of the setting of said printing mechanism, a Geneva gear mechanism including a follower connected between said driving means and said indicating means so that the indexing between said printing mechanism and said indicating means is absolute, and means coupled to said Geneva gear mechanism for axially shifting the relative position of said follower with respect to the Geneva gear of said mechanism to prevent the indexing of said indicating means and positioning the hub of said Geneva gear mechanism to lock said indicating means against further indexing.

8. A cyclically operated printing mechanism which is adapted to be indexed, driving means for indexing said printing mechanism, a clutch connecting said driving means to index said printing mechanism, said clutch comprising a Geneva gear drive means having a drive hub with a slotted aperture therein to permit the Geneva gear to rotate when the follower therefor engages said gear, means coupled to one of the elements of said Geneva gear drive means to shift said drive hub with respect to said Geneva gear to move said follower out of coupling position with respect to said Geneva gear, and means including the nonslotted portion of said drive hub locking said Geneva gear and said printing mechanism to prevent further indexing of said printing mechanism.

9. A cyclically operated indicating mechanism which is adapted to be indexed, driving means for said indicating mechanism, a clutch connecting said driving means to said indicating mechanism, said clutch comprising a Geneva gear drive means having a drive hub with a slotted aperture therein to permit the Geneva gear to rotate when the follower therefor engages said gear, means coupled to one of the elements of said Geneva gear drive means to shift said drive hub axially with respect to said Geneva gear to move said follower out of coupling position with respect to said Geneva gear, and means including the nonslotted portion of said drive hub locking said Geneva gear and said indicating mechanism to prevent further indexing of said indicating mechanism.

10. A cyclically operated printing mechanism eccentrically mounted for rotation within a rotatable housing into a printing position, a driving means connected to said rotatable housing adapted to continuously rotate said housing, an indexing mechanism connected to said printing mechanism adapted to index said printing mechanism by one character for each revolution of said housing, an indicating means mounted independently of said housing and adapted to be synchronized with the indexing of said printing means to provide a continuous indication of the setting of said printing mechanism, a Geneva gear mechanism including a follower between said driving means and said indicating means so that the indexing between said printing mechanism and said indicating means is absolute, and means for decoupling said indexing mechanism of said printing mechanism and the follower in said Geneva gear mechanism to prevent the indexing of said indicating means and positioning the hub of said Geneva gear mechanism to lock said indicating means against further indexing.

11. Apparatus for printing on a moving medium comprising a support frame, a rotatable driving means, an eccentrically mounted printing mechanism adapted to be rotatably driven by said driving means and brought into engagement with said medium at a peripheral speed equal to the speed of said medium, said printing mechanism being rotatably mounted on said frame, first gear means connected to said printing mechanism to index said mechanism by discrete steps as it is rotated, a second gear means connected to said rotatable driving means, said first and second gear means each comprising a rotatable driving gear and a driven gear wherein said driving gear includes a motion locking portion engaging a mating lock surface on said driven gear and said driving gear includes a driving member for engaging a driving recess in said driven gear when said locking portion is rotated away from said locking position so that there is always an absolute drive or lock relationship between said driving gear and said driven gear, and an indicating means coupled to said second gear means and being positively locked into mechanical agreement with said printing mechanism at all times and adapted to be indexed and to remain indexed with said printing mechanism, said indicating means being fixedly mounted on said support frame independently of said printing mechanism.

12. Apparatus as defined in claim 11 wherein said first and second gear means each comprise a Geneva gear mechanism.

References Cited in the file of this patent

UNITED STATES PATENTS

| | | |
|---|---|---|
| 209,647 | Brady | Nov. 5, 1878 |
| 571,659 | Grobet | Nov. 17, 1896 |
| 842,435 | Sutton | Jan. 29, 1907 |
| 1,028,199 | Dun Lany | June 4, 1912 |
| 1,273,793 | Pitney | July 23, 1918 |
| 1,500,424 | Smith | July 8, 1924 |
| 1,520,354 | Keller | Dec. 23, 1924 |
| 1,821,360 | Reinhardt | Sept. 1, 1931 |
| 1,943,711 | Aeschbach | Jan. 16, 1934 |

FOREIGN PATENTS

| | | |
|---|---|---|
| 360,051 | Great Britain | Nov. 5, 1931 |